(12) United States Patent
Wang et al.

(10) Patent No.: US 12,095,583 B2
(45) Date of Patent: Sep. 17, 2024

(54) VIEWPOINT ANALYSIS OF VIDEO DATA

(71) Applicant: International Business Machines Corporation, Armonk, NY (US)

(72) Inventors: Ziqiumin Wang, Shanghai (CN); Wei Jun Zheng, Shanghai (CN); Qing Lu, Shanghai (CN); Yuan Jin, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 17/407,121

(22) Filed: Aug. 19, 2021

(65) Prior Publication Data

US 2023/0054480 A1  Feb. 23, 2023

(51) Int. Cl.
| | | |
|---|---|---|
| G06F 15/16 | (2006.01) | |
| G06F 18/23 | (2023.01) | |
| G06N 20/00 | (2019.01) | |
| H04L 12/18 | (2006.01) | |

(52) U.S. Cl.
CPC .......... *H04L 12/1831* (2013.01); *G06F 18/23* (2023.01); *G06N 20/00* (2019.01); *H04L 12/1822* (2013.01)

(58) Field of Classification Search
CPC ............ H04L 12/1831; H04L 12/1822; G06K 9/6218; G06N 20/00
USPC ........................................................ 709/204
See application file for complete search history.

(56) References Cited

U.S. PATENT DOCUMENTS

| | | | | |
|---|---|---|---|---|
| 7,765,468 B2 * | 7/2010 | Munetsugu | ............. | G06F 16/70 715/236 |
| 8,140,069 B1 * | 3/2012 | Lall | ......... | H04M 1/24 704/226 |
| 8,549,076 B2 * | 10/2013 | Mizrahi | ................ | G06Q 99/00 709/205 |
| 8,818,180 B2 * | 8/2014 | Takao | .................... | H04N 5/783 345/204 |
| 9,342,625 B2 | 5/2016 | Doganata | | |
| 11,386,890 B1 * | 7/2022 | Fan | ..................... | G10L 15/1815 |
| 2001/0056506 A1 * | 12/2001 | Munetsugu | ............ | G06F 16/70 719/310 |

(Continued)

FOREIGN PATENT DOCUMENTS

| | | |
|---|---|---|
| CN | 102572372 B | 7/2012 |
| CN | 108287922 A | 7/2018 |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

(Continued)

*Primary Examiner* — Thuong Nguyen

(74) *Attorney, Agent, or Firm* — David K. Mattheis

(57) ABSTRACT

Video analysis by receiving video data associated with a multi-participant meeting, identifying a first participant viewpoint, a related argument and an authority level of a viewpoint-argument, from the video data using a machine learning model, identifying a first topic within the video data, correlating the first participant viewpoint to the first topic, determining a distance between the first participant viewpoint and a second participant viewpoint, the second participant viewpoint correlated to the first topic, and providing a depiction of a relationship between the first participant viewpoint and the second participant viewpoint according to the distance.

20 Claims, 6 Drawing Sheets

(56) References Cited

U.S. PATENT DOCUMENTS

| | | | |
|---|---|---|---|
| 2003/0187829 A1* | 10/2003 | Emura | G06F 16/40 |
| 2005/0125216 A1* | 6/2005 | Chitrapura | G06F 40/30 704/1 |
| 2008/0154883 A1* | 6/2008 | Chowdhury | G06F 3/0482 707/999.005 |
| 2010/0011072 A1* | 1/2010 | Mishchenko | G06Q 10/10 709/206 |
| 2014/0229866 A1* | 8/2014 | Gottlieb | G06F 3/0486 709/204 |
| 2014/0281862 A1 | 9/2014 | Dailey | |
| 2015/0029901 A1* | 1/2015 | Patel | H04L 12/185 370/261 |
| 2015/0081787 A1* | 3/2015 | Ainslie | H04N 1/32101 709/204 |
| 2015/0089399 A1 | 3/2015 | Megill | |
| 2016/0192006 A1* | 6/2016 | Alfishawi | H04N 21/44204 725/32 |
| 2016/0337213 A1* | 11/2016 | Deutsch | H04L 43/045 |
| 2017/0237788 A1* | 8/2017 | Xi | H04L 65/4015 709/204 |
| 2018/0052840 A1* | 2/2018 | Scott | H04L 67/535 |
| 2018/0176508 A1* | 6/2018 | Pell | H04L 65/4015 |
| 2020/0311122 A1* | 10/2020 | Ramamurthy | G06N 20/20 |
| 2020/0364599 A1* | 11/2020 | Ma | G06F 17/18 |
| 2021/0052580 A1* | 2/2021 | Framroze | A61K 47/26 |
| 2021/0065321 A1* | 3/2021 | McKenzie | H04L 67/02 |
| 2021/0383127 A1* | 12/2021 | Kikin-Gil | G06V 10/82 |
| 2021/0407520 A1* | 12/2021 | Neckermann | H04L 12/1831 |
| 2022/0021845 A1* | 1/2022 | Schneider | G06F 3/04847 |
| 2022/0107852 A1* | 4/2022 | Kulkarni | G06F 9/542 |
| 2022/0108195 A1* | 4/2022 | Kehler | G06F 18/295 |
| 2022/0189472 A1* | 6/2022 | Jepperson | G06F 3/167 |
| 2022/0237892 A1* | 7/2022 | Anderton-Yang | G06V 10/82 |

OTHER PUBLICATIONS

Trabelsi et al., "Finding Arguing Expressions of Divergent Viewpoints in Online Debates", Proceedings of the 5th Workshop on Language Analysis for Social Media (LASM) @ EACL 2014, pp. 35-43, Gothenburg, Sweden, Apr. 26-30, 2014, 2014 Association for Computational Linguistics.

* cited by examiner

100

VIEWPOINT ANALYSIS OF VIDEO DATA

FIELD OF THE INVENTION

The disclosure relates generally to the analysis of video data. The disclosure relates particularly to machine learning-based real-time, identification, analysis, and presentation of viewpoints extracted from video data.

BACKGROUND

Meeting through videoconferencing enable individuals distributed at different locations to meet and discuss issues. Such meetings occur in real time and may also be recorded. The process of enabling such meeting generates digitized audio and video data, including participant audio comments as well as presentation slides used to convey information.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable viewpoint analysis of video data.

Aspects of the invention disclose methods, systems and computer readable media associated with video analysis by receiving video data associated with a multi-participant meeting, identifying a first participant viewpoint, a related argument and an authority level of a viewpoint-argument, from the video data using a machine learning model, identifying a first topic within the video data, correlating the first participant viewpoint to the first topic, determining a distance between the first participant viewpoint and a second participant viewpoint, the second participant viewpoint correlated to the first topic, and providing a depiction of a relationship between the first participant viewpoint and the second participant viewpoint according to the distance.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
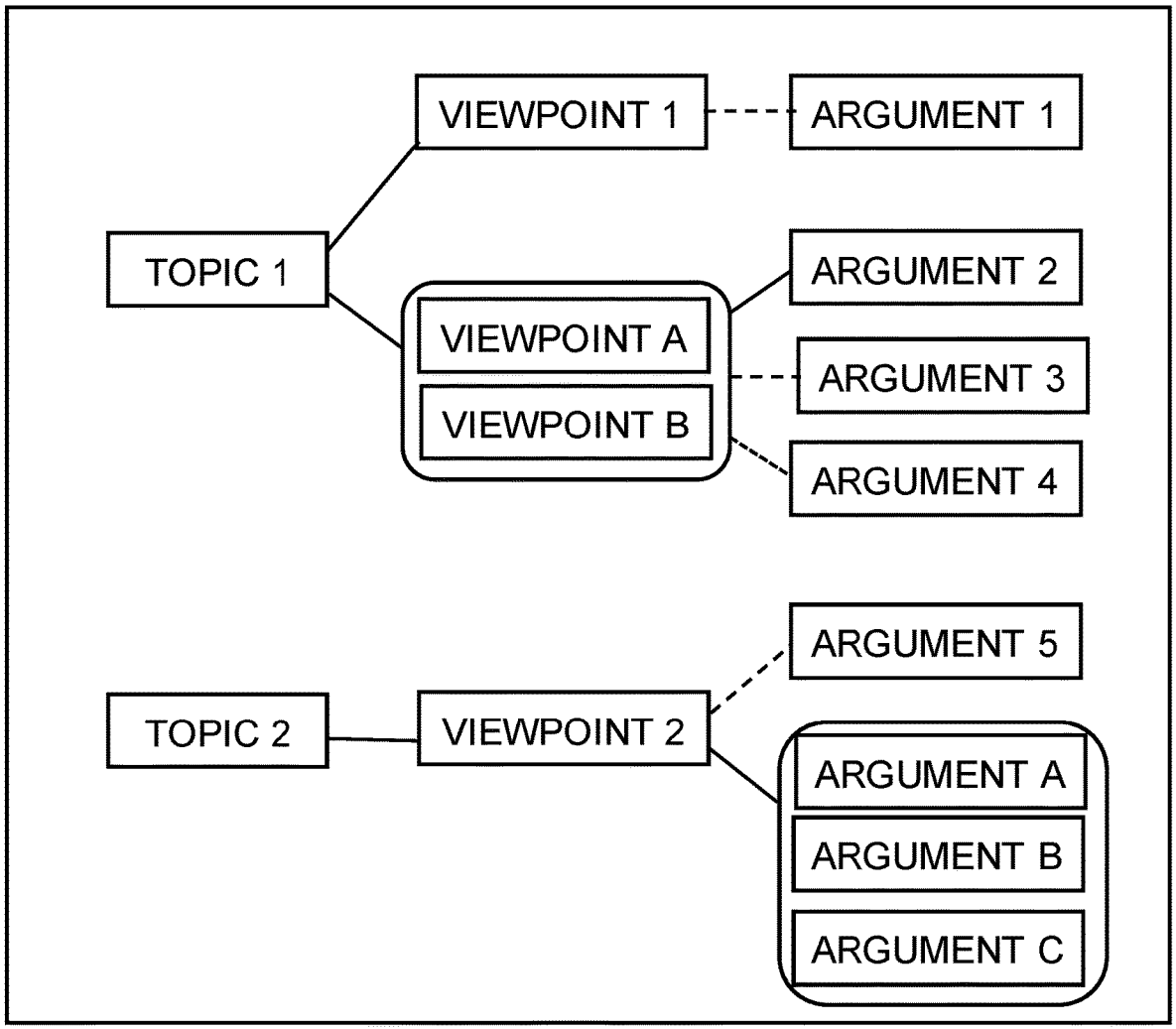
FIG. 1 depicts a graphical output of participant viewpoints, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

As used herein, video data is considered broadly to include visual and accompany audio data combined into a video meeting or other production.

Participants collaborate and speak up in online video meetings. As a meeting continues, participants deliver large amount of information. This information includes different viewpoints as well as various arguments to support viewpoints. Some information might be similar or the same, while some information is even contradictory to other information. During the online meeting, it's not easy to completely capture or remember each and every viewpoint as well as their respective supporting arguments. Users might rely on a note taker to record, organize, and summarize all information, but the note takers may not completely collect all information in real time for people to understand the current situation and then continue the discussion. In most instances, note takers count on meeting recordings of video and audio to create the meeting summary after the meeting. Such post-meeting activities may result in a need to schedule follow-up meetings for further discussion. Such follow up meetings consume valuable time and other resources. Disclosed embodiments provide methods to timely identify, analyze, and visualize all viewpoints and their supporting arguments during an online video meeting to avoid unnecessary conflicts and improve meeting efficiency, as well as supplementing decision making in the meeting. Disclosed embodiments provide real-time analysis of expressed topics and viewpoints during the meeting to augment other meeting content.

Aspects of the present invention relate generally to the real-time analysis of video meeting data to extract and summarize topics presented as well as the viewpoints and supporting arguments contributed by meeting participants. In an embodiment, a method receives video data, the method converts audio and visual data to textual data. Analysis of the text data leads to identification of presented topics and of participant viewpoints, supporting arguments associated with the presented topics. A trained machine learning model provides outputs indicating the relationship between participants viewpoints and arguments as well as an output indicating the strength or authority associated with the participants' arguments. The method evaluates the inputs of differing participants and determines the relationships between these inputs—agreement, disagreement, etc., for multiple inputs associated with a single topic. The method generates a depiction summarizing the topics, viewpoints and arguments of the participants of the meeting and provides that depiction as an output to a user of the method.

In accordance with aspects of the invention there is a method for automatically analyzing video content to extract and summarize topic information in conjunction with participant contributions and including determining the relationships individual participant contributions have to each other and to the respective topics. The method utilizes machine learning to determine relationships between contributions and also a level (low, medium or high) of authority of the contributions.

Aspects of the invention provide an improvement in the technical field of video analysis through the use of a trained machine learning model for the purposes of determining the logical relationships between respective participant contributions as well as the level of authority associated with the respective contributions.

Aspects of the invention also provide an improvement to computer functionality. In particular, implementations of the invention are directed to a specific improvement to the way video data analysis provides a real-time summary of meeting topics, participant contributions and the relationships to the meeting topics as well as the level of authority of the arguments proffered in support of provided participant viewpoints.

In an embodiment, one or more components of the system can employ hardware and/or software to solve problems that are highly technical in nature (e.g., receiving data, converting video and audio data to text data, identifying a first viewpoint and a related argument from within the video data, identifying a topic from the video data, correlating the topic and viewpoint, determining a distance between the first viewpoint and a second viewpoint correlated to the topic, providing a depiction of a relationship between the first and second viewpoints, etc.). These solutions are not abstract and cannot be performed as a set of mental acts by a human due to the processing capabilities needed to facilitate video and audio data analysis. Further, some of the processes performed may be performed by a specialized computer for carrying out defined tasks related to analyzing online meeting data. For example, a specialized computer can be employed to carry out tasks related to analyzing online meeting data or the like.

In an embodiment, the method for video analysis includes receiving digitized video data associated with a multi-participant meeting. Such video data include audio and visual components captured using cameras, microphones, and presented directly from computer memories. In this embodiment, the method scans the received data and extracts text data, the method further conducts optical character recognition on visual data to convert and extract additional data as text from the visual data. The method further scans the audio component of the received data and applies speech to text programming to the data resulting in additional text data.

In an embodiment, the method uses a machine learning model to receive the text data as input and to identify meeting participant viewpoints, identify participant arguments offered in support of those viewpoints, and determine an authority level for the viewpoints/arguments. In an embodiment, the model includes a deep learning neural network classification model based on bidirectional transformers. The purpose of the model is to identify the logical relationship between two input statements (that is: one statement is the supportive argument of the other statement as the viewpoint). The first classification output of the model indicates the relationship between two input statements considered as a pair. For each pair (A, B), the method outputs a vector embedding indicating that A is the supportive argument of viewpoint B, that B is the supportive argument of viewpoint A, or that neither A nor B is a supportive argument of the other as a viewpoint.

In this embodiment, the second classification output of the model is a three-dimensional vector output indicating a level of authority associated with the statement pair (A, B). This classification output indicates a level of authority associated with the argument offered in support of a viewpoint based upon the network weights of the trained machine learning model.

In an embodiment, the method further analyzes the input and extracted text data using natural language processing or natural language understanding to identify one or more topic areas included in the text data. Disclosed embodiments can perform natural language processing for extraction of NLP output parameter values from received text data. NLP includes performing one or more of a topic classification process that determines topics of the meeting data, one or more topic NLP output parameter values. Part-of-speech tagging methodologies can include use of, e.g., Constraint Grammar, Brill tagger, Baum-Welch algorithm (the forward-backward algorithm) and the Viterbi algorithm which can employ use of the Hidden Markov models. Hidden Markov models can be implemented using the Viterbi algorithm. The Brill tagger can learn a set of rule patterns, and can apply those patterns rather than optimizing a statistical quantity. Applying natural language processing can also include performing sentence segmentation which can include determining where a sentence ends, including, e.g., searching for periods, while accounting for periods that designate abbreviations.

In this embodiment, the method correlates participant viewpoints extracted by the machine learning model with NLP extracted topics using topic correlation algorithms. The method groups extracted viewpoint-argument pairings according to their respective topic correlations.

In an embodiment, the method determines a distance between pairs of viewpoints correlated to a common topic. In this embodiment, the method determines a similarity between viewpoint pairings, and argument pairings, based on the text frequency of the identified text. Examples of methods of determining the similarity of text-based documents include Jaccard distance, Cosine distance, Euclidean distance, Relaxed Word Mover's Distance, and may utilize term frequency-inverse document frequency (tf-idf) techniques. A person of ordinary skill in the art may apply other techniques of determining similarity between page pairings of a document other than those presented, herein, and not deviate from or limit the features of embodiments of the present invention. In an embodiment, the method determines a distance between the first participant viewpoint and a second participant viewpoint, the second participant viewpoint correlated to the first topic, and compares the determined distance to a threshold to identify similar viewpoints for a common topic.

In an embodiment, similar pairings, such as those having a distance above a defined threshold, are clustered together, e.g., similar arguments supporting a common viewpoint, similar viewpoints related to a common topic. In this embodiment, the method generates a summarizing depiction of the determined topic, viewpoint, argument, and authority information. In one such depiction, the method depicts isolated arguments as individual blocks, while similar arguments are represented by a collection of argument blocks surrounded by a common border. Common viewpoints are similarly gathered and surrounded by a common border. Relationships between topics and viewpoints are indicated by lines connecting the respective topic and viewpoint blocks. Similarly, lines connect argument blocks to associated viewpoints. In an embodiment the lines connecting arguments and viewpoints are coded to indicate the authority of the corresponding argument. As an example, different colors indicate each of high, medium, and low authority for an argument. As a second example, a solid line, dashed line, and dotted line relate respectively to high, medium, and low authority levels for arguments.

FIG. 1 illustrates an exemplary output 100, from the method. As shown in the Figure, Viewpoint 1 and merged viewpoints A and B correlate to topic 1. Argument 1 supports viewpoint 1 and has a medium authority level indicated by a dashed line connecting the argument and viewpoint boxes. Also, from the figure, arguments 2, 3, and 4, support merged viewpoints A and B. Argument 2 has a high level of authority (solid line) three has a medium level (dashed line) and four has a low-level of authority (dotted line). Topic 2 correlates to viewpoint 2, which is in turn supported by argument 5, and merged arguments A, B, and C. Argument 5 has a medium level of authority while the merged arguments have a high level of authority.

Figure 2:
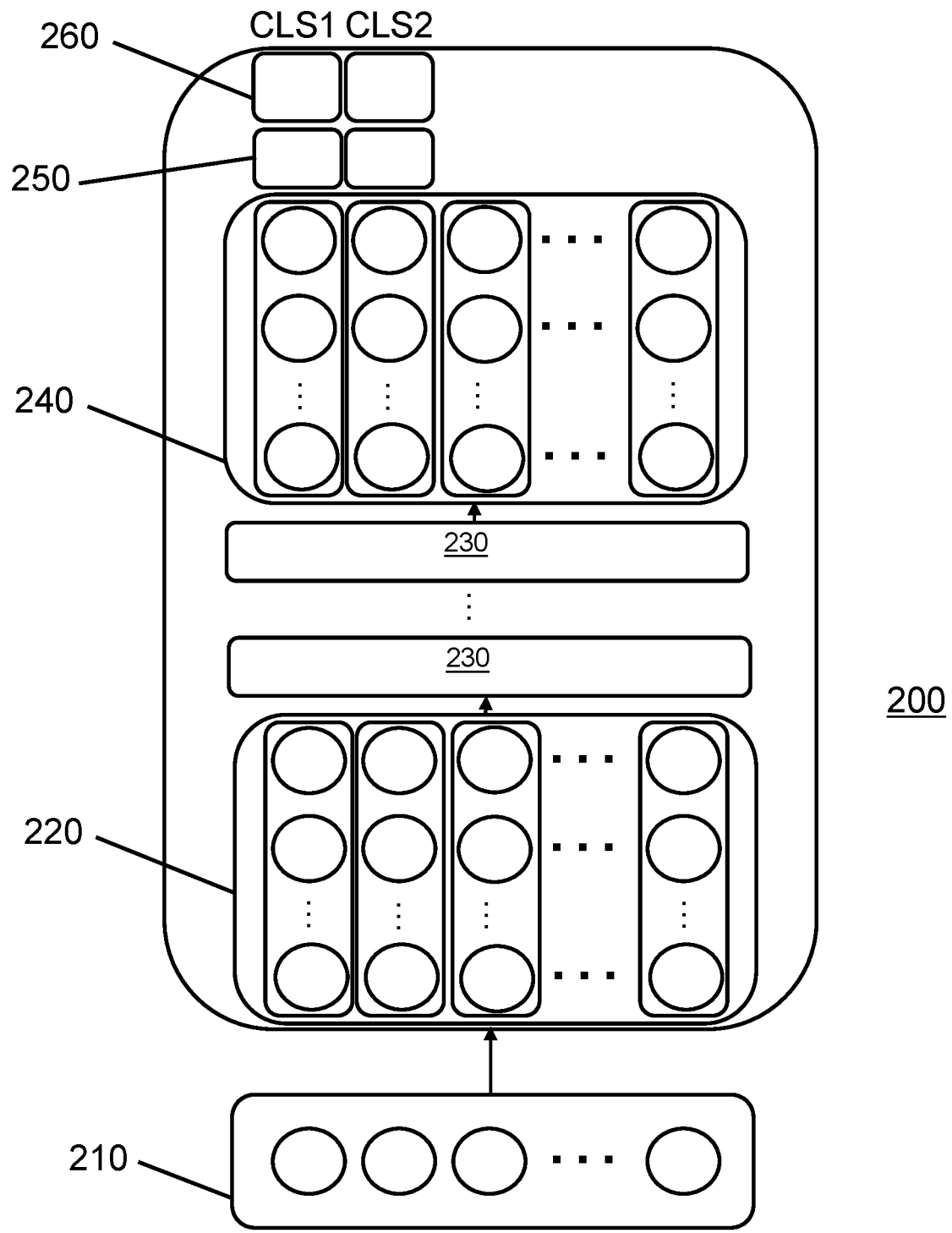
FIG. 2 illustrates a machine learning model architecture, according to an embodiment of the invention.

FIG. 2 illustrates a schematic structure 200, of a machine learning model according to an embodiment of the invention. As shown in the Figure, model 200 receives input text 210. The model transforms the input text 210 to corresponding vector embeddings 220. In an embodiment, the vector embeddings are the sum of token embeddings corresponding to the two input statements, as well as segment embeddings, position embeddings, line embeddings and topic embeddings. The method passes the embedding through a multi-layer network of transformer encoders 230. In one embodiment the model 200 includes 18 transformer encoders 230. Encoders 230 yield transformed embeddings 240. The first two output token embeddings from the topmost transformer are fed separately into a full-connection layer 250, and then into a softmax layer 260. The model yields CLS1 and CLS2, as outputs.

The first output (CLS1) is a three-dimensional vector and each dimension indicates one of three logical relationship:
  Statement A is the supported argument of statement B as the viewpoint.
  Statement B is the supported argument of statement A as the viewpoint.
  Statement A is not the supported argument of statement B as the viewpoint and vice versa.

The second output (CLS2) is a three-dimensional vector and each dimension indicates one of three argument authority level (low, medium, high).

An example of embedding the two input statements as input to the model. As shown in the Figure, two statements "Hero will not die" and "he is an alien" are appended after two special heading tokens CLS1, and CLS2, concatenated and separated by a special token SEP, and a final separator SEP. The final embedding is the sum of the token embeddings, segment embeddings, position embeddings, line embeddings, and topic embeddings.

Token embeddings indicate indices of input sequence tokens in the vocabulary. Segment embeddings indicate which tokens belong to each input statement. Value 0 points to first statement and value 1 points to second one. Position embeddings indicate each token's position in input sequence. Line embeddings indicate how many lines between two input statements within where they come from (e.g. an online doc). The value range is [0, 1023] in which the index 1023 has a special meaning (that is, exceed 1022 lines). The first input statement always uses value 0. Topic embedding(s) indicates the index of the topic to which the two input statements belong.

Training the model includes processing labeled data and using backpropagation and gradient descent to minimize a loss function for the labeled data. Generating the labeled data includes manually reviewing a corpus of documents and adding labels to statement pairs identifying pair elements as viewpoint, supporting argument, or neither. The training data set further includes labeling an authority level for the documents of the corpus according to a generalized consensus or an authorizing standard setting body. The method transforms the labeled authority for each document into an authority vector embedding for the document. The authority vector is used by the model in training.

In an embodiment, during training, for a classification of CLS1 as 0, no relationship between the two statements, CLS2 is forced to 0 as well. The training progresses with the labeled statement and labeled authority data to minimize the cross-entropy losses for the combination of CLS1 and CLS2, through gradient descent and backpropagation.

In an embodiment, the method includes training the machine learning model using labeled viewpoint-argument data. Such data enables a refinement to the machine learning model training with respect to classifying viewpoint-argument relationships.

In an embodiment, the method predicts an authoritative rank of the viewpoint-argument logical relationship according to an authoritative vector embedding associated with labeled viewpoint-argument logical relationship data provided to the machine learning model for training.

In an embodiment, the method includes training the first machine learning model using at least one of token embeddings, segment embeddings, position embeddings, line embeddings, and topic embeddings, determined from the labeled video data.

Figure 3:
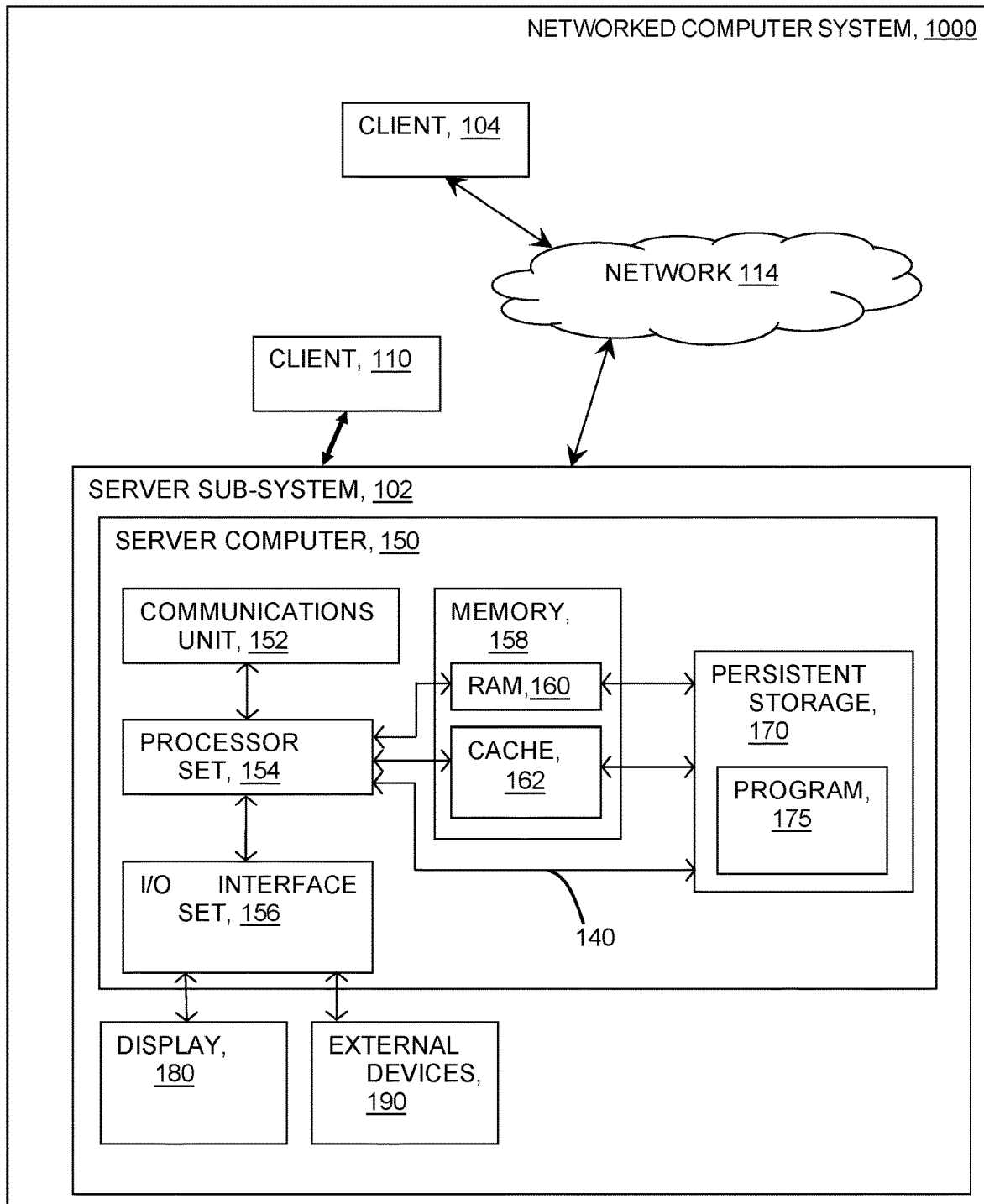
FIG. 3 provides a schematic illustration of a computing environment, according to an embodiment of the invention.

FIG. 3 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise video analysis program (not shown) together with sufficient computing resource (processor, memory, network communications hardware) to execute the program. As shown in FIG. 3, server sub-system 102 comprises a server computer 150. FIG. 3 depicts a block diagram of components of server computer 150 within a networked computer system 1000, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the video data analysis program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., video data analysis program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 4:
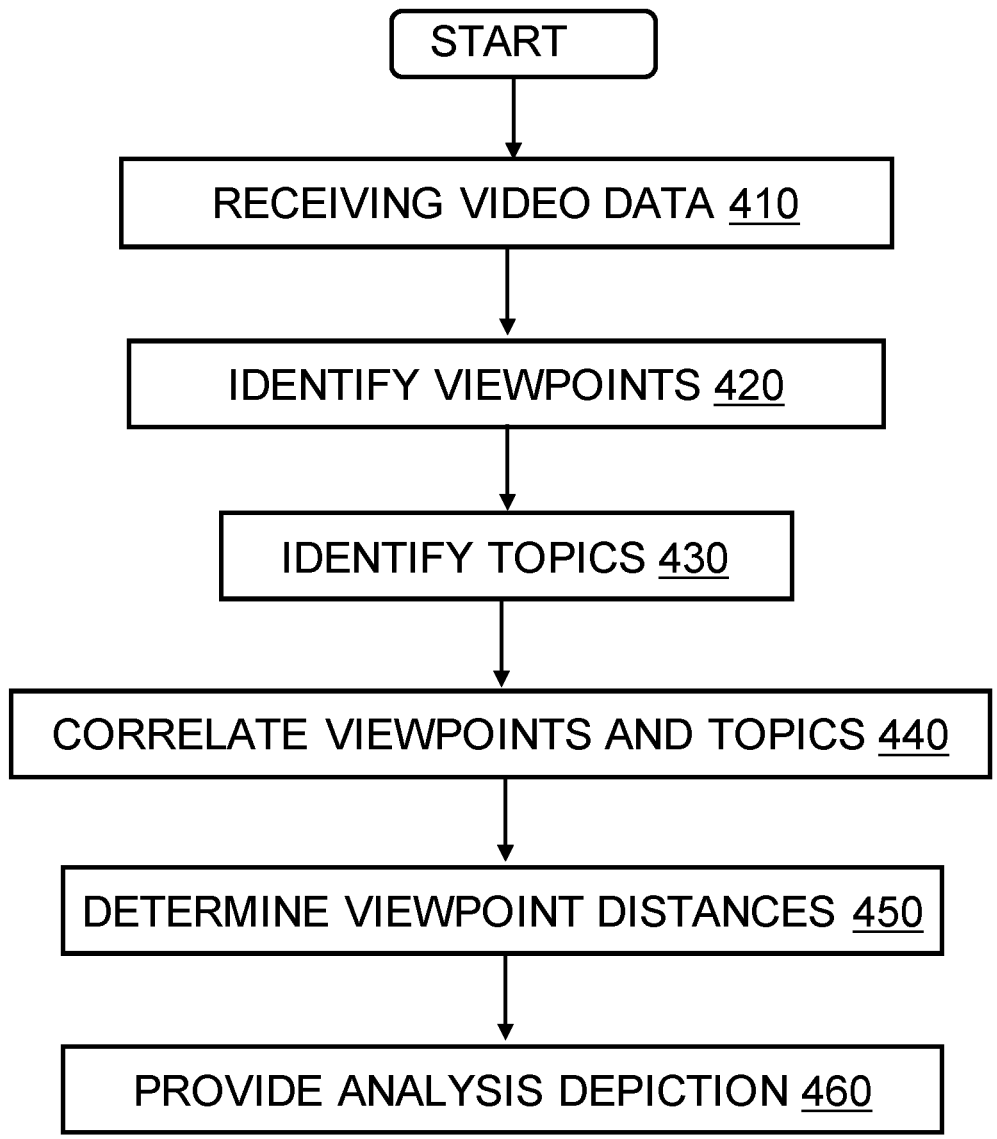
FIG. 4 provides a flowchart depicting an operational sequence, according to an embodiment of the invention.

FIG. 4 provides a flowchart 400, illustrating exemplary activities associated with the practice of the disclosure. After program start, at block 410, video analysis program 175 receives video data including digitized audio, visual, and other data, such as presentation data. In an embodiment, the method scans the data, performs optical character recognition on non-text graphical data, and converts audio data to text using speech to text programming.

At block 420, the method analyzes the text data using a machine learning model to identify and classify participant contributions as viewpoints and arguments supporting those viewpoints. The machine learning model outputs identified viewpoints, arguments supporting those viewpoints and a predicted authority level for the arguments.

At block 430, the method analyzes the text data using NLP or similar programming to extract topic areas contained in the data. At block 440, the method correlates participant viewpoint/arguments with topic areas.

At block 450, the method determines similarities between viewpoints correlated to a common topic. In an embodiment, the method determines a word mover distance between viewpoint pairings and clusters viewpoints according to the determined word mover distances. In an embodiment, the method determines similarities between arguments associated with a common viewpoint using argument pairings' word mover distances. The method clusters/merges similar arguments associated with a common viewpoint. In an embodiment, the method considers the predicted authority of each merged argument and assigns the highest level of predicted authority from the members of the merged group to the entire group of arguments.

At block 460, the video data analysis program provides a graphical depiction of the relationships of the topics, viewpoints, and arguments, extracted from the data, such as that depicted in FIG. 1. In an embodiment, the depiction is provided and updated in real-time as a meeting progresses. This enables participants to track the ongoing discussion and maintain a high level of engagement with the presented content and associated discussion. The depiction provides documentation of the topics discussed, the viewpoints expressed, how those viewpoints were supported—including providing an indication of the substantive weight of the arguments offered in support of the respective viewpoints. In an embodiment, decisions made in the meeting represent individual topics, the disclosed methods enable documentation of the viewpoints and arguments associated with the respective decisions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
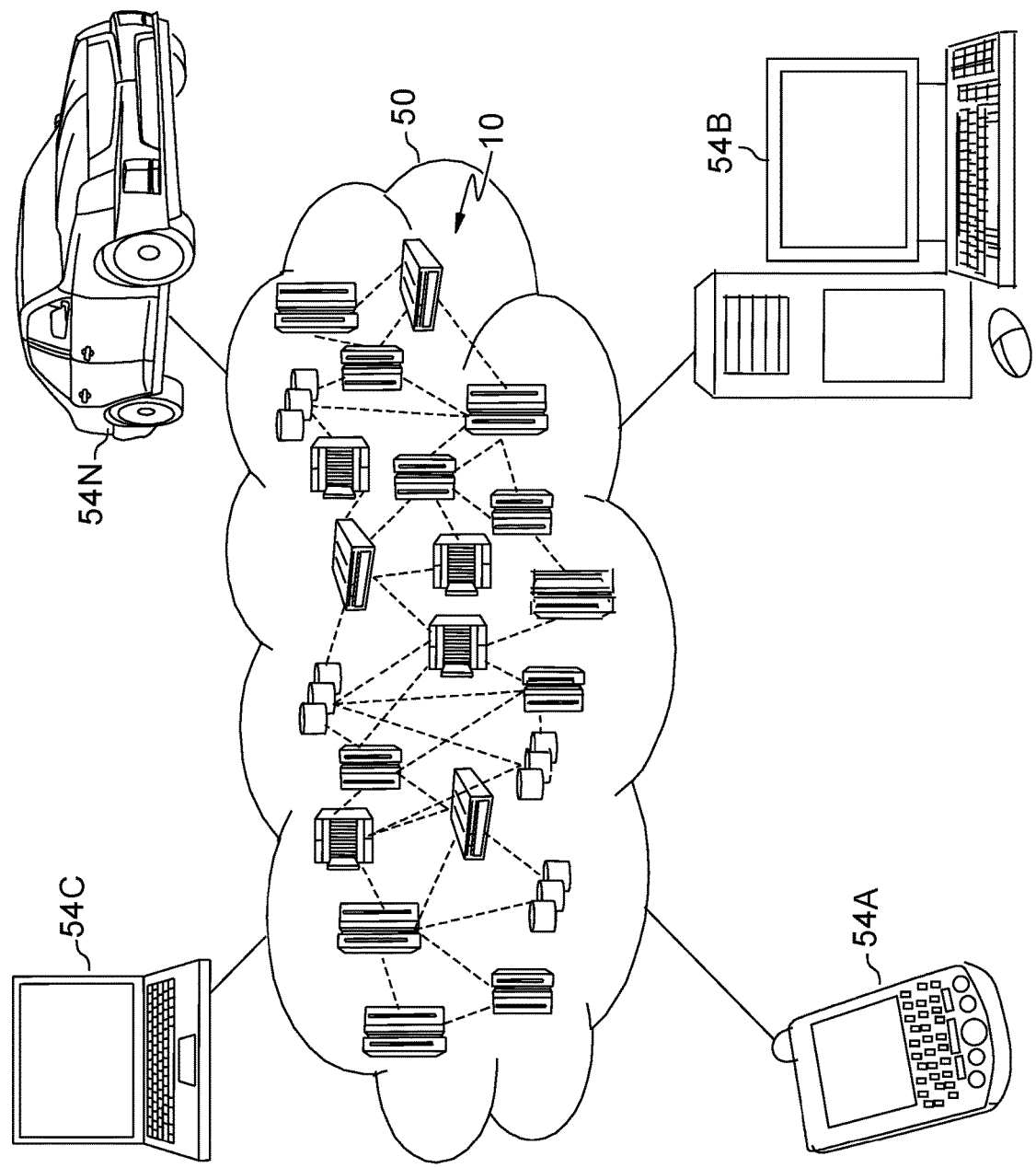
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
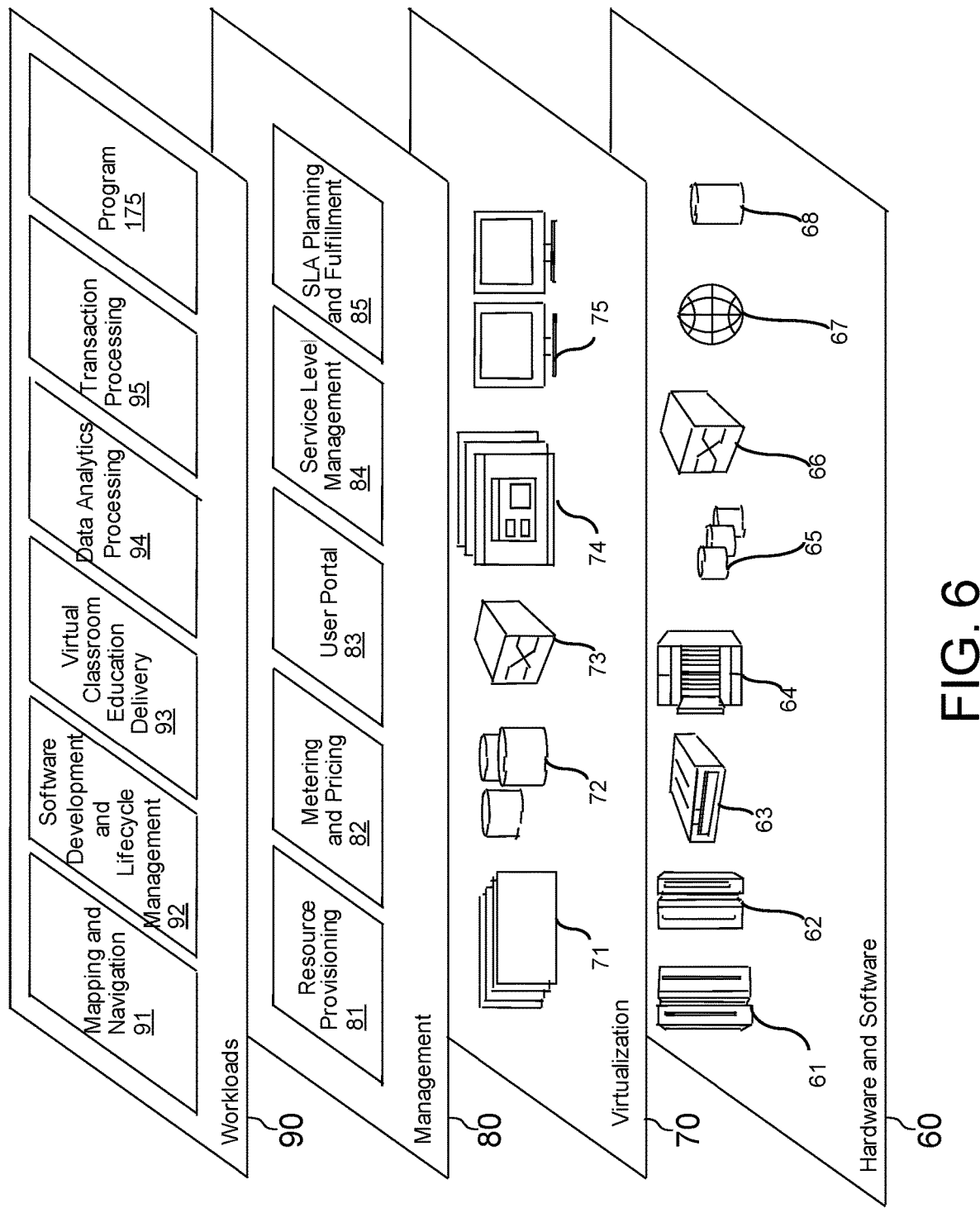
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video data analysis program 175.

The present invention may be a system, a method, and/or a computer program product at any possible technical detail level of integration. The invention may be beneficially practiced in any system, single or parallel, which processes an instruction stream. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for video analysis, the method comprising:
   receiving over a network, by one or more computer processors, video data associated with a multi-participant meeting;
   identifying, by the one or more computer processors, a first participant viewpoint, a related argument and an authoritative rank of a viewpoint-argument, from the video data using a machine learning model;
   identifying, by the one or more computer processors, a first topic within the video data;
   correlating, by the one or more computer processors, the first participant viewpoint to the first topic;
   determining, by the one or more computer processors, a distance between the first participant viewpoint and a second participant viewpoint, the second participant viewpoint correlated to the first topic; and
   providing over the network, by the one or more computer processors, a depiction of a relationship between the first participant viewpoint, the related argument, the authoritative rank of the viewpoint-argument, and the second participant viewpoint according to the distance.

2. The computer implemented method according to claim 1, further comprising:
   converting, by the one or more computer processors, non-text portions of the video data to text data.

3. The computer implemented method according to claim 2, further comprising predicting, by the one or more computer processors, a viewpoint-argument logical relationship between two input portions of the text data.

4. The computer implemented method according to claim 1, further comprising:
   clustering, by the one or more computer processors, the first participant viewpoint and the second participant viewpoint according to the distance.

5. The computer implemented method according to claim 1, further comprising receiving, by the one or more computer processors, labeled viewpoint-argument logical relationship data; and training the machine learning model according to the viewpoint-argument logical relationship data.

6. The computer implemented method according to claim 1, further comprising predicting, by the one or more computer processors, an authoritative rank of the viewpoint-argument according to an authoritative vector embedding associated with labeled viewpoint-argument data.

7. The computer implemented method according to claim 1, further comprising training, by the one or more computer processors, the machine learning model using at least one of token embeddings, segment embeddings, position embeddings, line embeddings, and topic embeddings, determined from the video data.

8. A computer program product for video analysis, the computer program product comprising one or more computer readable storage devices and collectively stored program instructions on the one or more computer readable storage devices, the stored program instructions comprising:
   program instructions to receive video data associated with a multi-participant meeting, over a network;
   program instructions to identify a first participant viewpoint, a related argument and an authoritative rank of a viewpoint-argument, from the video data using a machine learning model;
   program instructions to identify a first topic within the video data;
   program instructions to correlate the first participant viewpoint to the first topic;
   program instructions to determine a distance between the first participant viewpoint and a second participant viewpoint, the second participant viewpoint correlated to the first topic; and
   program instructions to provide, over the network, a depiction of a relationship between the first participant viewpoint, the related argument, the authoritative rank of the viewpoint-argument, and the second participant viewpoint according to the distance.

9. The computer program product according to claim 8, the stored program instructions further comprising:
   program instructions to convert non-text portions of the video data to text data.

10. The computer program product according to claim 9, the stored program instructions further comprising program instructions to predict a viewpoint-argument logical relationship between two input portions of the text data.

11. The computer program product according to claim 8, the stored program instructions further comprising:
    program instructions to cluster the first participant viewpoint and the second participant viewpoint according to the distance.

12. The computer program product according to claim 8, the stored program instructions further comprising program instructions to receive labeled viewpoint-argument logical relationship data; and program instructions to train the machine learning model according to the viewpoint-argument logical relationship data.

13. The computer program product according to claim 8, the stored program instructions further comprising program instructions to predict an authoritative rank of the viewpoint-argument according to an authoritative vector embedding associated with labeled viewpoint-argument data.

14. The computer program product according to claim 8, the stored program instructions further comprising program instructions to train the machine learning model using at least one of token embeddings, segment embeddings, position embeddings, line embeddings, and topic embeddings, determined from the video data.

15. A computer system for video analysis, the computer system comprising:
one or more computer processors;
one or more computer readable storage devices; and
stored program instructions on the one or more computer readable storage devices for execution by the one or more computer processors, the stored program instructions comprising:
program instructions to receive video data associated with a multi-participant meeting, over a network;
program instructions to identify a first participant viewpoint, a related argument and an authoritative rank of a viewpoint-argument, from the video data using a machine learning model;
program instructions to identify a first topic within the video data;
program instructions to correlate the first participant viewpoint to the first topic;
program instructions to determine a distance between the first participant viewpoint and a second participant viewpoint, the second participant viewpoint correlated to the first topic; and
program instructions to provide, over the network, a depiction of a relationship between the first participant viewpoint, the related argument, the authoritative rank of the viewpoint-argument, and the second participant viewpoint according to the distance.

16. The computer system according to claim 15, the stored program instructions further comprising:
program instructions to convert non-text portions of the video data to text data.

17. The computer system according to claim 16, the stored program instructions further comprising program instructions to predict a viewpoint-argument logical relationship between two input portions of the text data.

18. The computer system according to claim 15, the stored program instructions further comprising:
program instructions to cluster the first participant viewpoint and the second participant viewpoint according to the distance.

19. The computer system according to claim 15, the stored program instructions further comprising program instructions to receive labeled viewpoint-argument logical relationship data; and program instructions to train the machine learning model according to the viewpoint-argument logical relationship data.

20. The computer system according to claim 15, the stored program instructions further comprising program instructions to predict an authoritative rank of the viewpoint-argument according to an authoritative vector embedding associated with labeled viewpoint-argument data.

* * * * *